United States Patent
Katou et al.

(10) Patent No.: US 7,225,907 B2
(45) Date of Patent: Jun. 5, 2007

(54) HYDRAULIC PRESSURE CONTROL SYSTEM

(75) Inventors: Yoshiaki Katou, Kanagawa (JP); Isamu Ohtake, Shizuoka (JP)

(73) Assignee: JATCO Ltd, Fuji-shi (JP)

( * ) Notice: Subject to any disclaimer, the term of this patent is extended or adjusted under 35 U.S.C. 154(b) by 290 days.

(21) Appl. No.: 11/062,487

(22) Filed: Feb. 23, 2005

(65) Prior Publication Data
US 2005/0183916 A1    Aug. 25, 2005

(30) Foreign Application Priority Data
Feb. 23, 2004    (JP)    ............... 2004-045610

(51) Int. Cl.
*F16H 61/04*    (2006.01)
(52) U.S. Cl. .................. 192/3.26; 192/3.58; 192/3.61
(58) Field of Classification Search ............. 192/3.25, 192/3.26, 3.51, 3.61, 87.16, 87.18
See application file for complete search history.

(56) References Cited

U.S. PATENT DOCUMENTS

| | | | | |
|---|---|---|---|---|
| 2,627,189 A | * | 2/1953 | McFarland | ............... 477/57 |
| 2,699,074 A | * | 1/1955 | Livezey et al. | ............... 477/61 |
| 3,747,436 A | * | 7/1973 | Hause | ............... 475/69 |
| 5,040,648 A | * | 8/1991 | Mitchell et al. | ............ 192/3.58 |

FOREIGN PATENT DOCUMENTS

JP    7-269667 A    10/1995

* cited by examiner

*Primary Examiner*—Saul Rodriguez
(74) *Attorney, Agent, or Firm*—Foley & Lardner LLP (57) ABSTRACT

A hydraulic pressure control system for an automatic transmission is comprised of an engagement element engaged when the vehicle runs and a first engagement control actuator controlling the engagement element by supplying the controlled hydraulic pressure to the engagement element when the vehicle starts running. An effective cross sectional area of the engagement element is set at a minimum area which has an engagement capacity capable of transmitting a maximum torque inputted from the engine when the engagement element receives a maximum pressure controlled by the first engagement control actuator.

9 Claims, 7 Drawing Sheets

HYDRAULIC PRESSURE CONTROL SYSTEM

BACKGROUND OF THE INVENTION

The present invention relates to an automatic transmission employing a torque converter as a starting element, and more particularly to an automatic transmission which controls an engagement force of a clutch such as a forward clutch using an actuator for a lockup clutch hydraulic control.

Japanese Published Patent Application No. 7-269667 discloses an automatic transmission which employs a torque converter as a starting element. It is generally necessary to set an engagement capacity of a forward clutch at a value greater than a product of an engine torque and a stall torque ratio of a forward clutch. The forward clutch is designed so that a piston thereof has a large outer diameter to ensure a sufficient engagement capacity.

SUMMARY OF THE INVENTION

However, the related art does not disclose a feature as to the optimization of the forward clutch taking account of a hydraulic circuit thereof. It is now required to totally design the forward clutch and the hydraulic circuit thereof. Particularly, in case that a vehicle having an idle stop function does not employ an electromotive oil pump, a supply of hydraulic pressure is limited at an engine restarting period. Therefore, if the forward clutch has a large diameter such that a piston ensures a large cross section, a hydraulic startup of the forward clutch is delayed at the engine restarting period. Therefore it is important to design the automatic transmission so as to optimize the hydraulic circuit thereof.

It is therefore an object of the present invention to provide a hydraulic pressure control system for an automatic transmission, which is designed so as to optimize the forward clutch taking account of a hydraulic circuit thereof.

An aspect of the present invention resides in a hydraulic pressure control system for an automatic transmission of a vehicle, which comprises a hydraulic pressure source driven by an internal combustion engine of the vehicle to generate a hydraulic pressure; an engagement element engaged when the vehicle runs, the engagement element having an effective cross sectional area which receives a controlled hydraulic pressure generated from the hydraulic pressure; and a first engagement control actuator controlling a lockup clutch of a torque converter, the first control actuator controlling the engagement element by supplying the controlled hydraulic pressure to the engagement element when the vehicle starts running; wherein the effective cross sectional area is set at a minimum area which has an engagement capacity capable of transmitting a maximum torque inputted from the engine when the engagement element receives a maximum pressure controlled by the first engagement control actuator.

Another aspect of the present invention resides in a hydraulic pressure control system for an automatic transmission with a torque converter. The hydraulic pressure control system comprises an engagement element put in an engagement state when a vehicle runs, the engagement element including a piston of receiving a controlled hydraulic pressure; and a first actuator controlling a lockup clutch of the torque converter, the first actuator controlling the engagement state of the engagement element when the vehicle starts running; wherein an effective cross sectional area of the piston is set at a smallest area of areas which have an engagement capacity capable of transmitting a maximum torque inputted from the engine when the engagement element receives a maximum pressure controlled by the first actuator.

A further aspect of the present invention resides in a method of controlling an engagement element of an automatic transmission installed in a vehicle which is equipped with an internal combustion engine and an automatic transmission with a torque converter. The method comprising the steps of: controlling the engagement element using a first actuator for controlling a lockup clutch of the torque converter when the vehicle starts running; and controlling the engagement element using a second actuator which is capable of outputting a hydraulic pressure higher than a hydraulic pressure of the first actuator after the engagement element is engaged by the control of the first actuator.

The other objects and features of this invention will become understood from the following description with reference to the accompanying drawings.

DETAILED DESCRIPTION OF THE INVENTION

Hereinafter, there is discussed a preferred embodiment of an automatic transmission according to the present invention with reference to the drawing.

Figure 1:
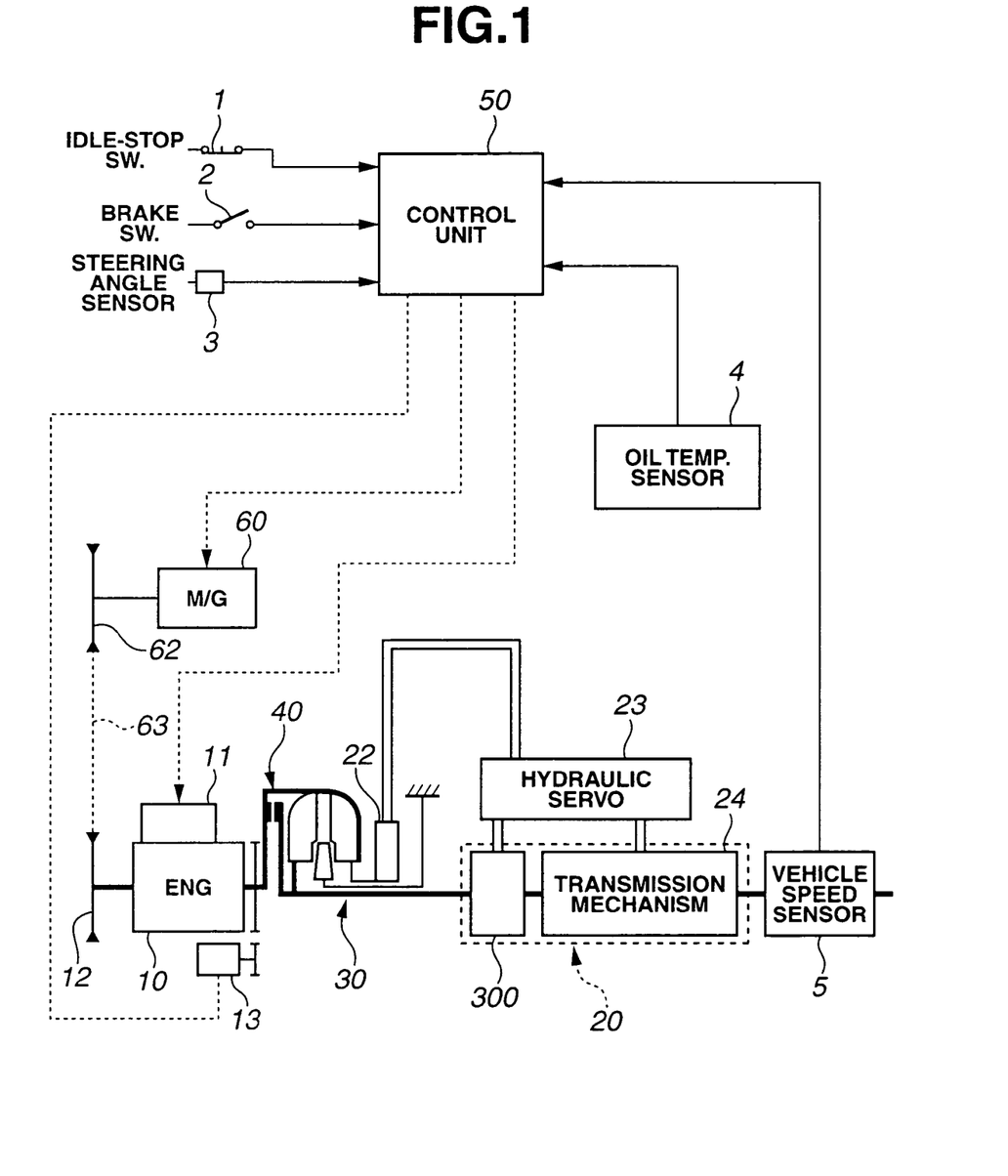
FIG. 1 is a schematic view showing a main unit of a vehicle equipped with a hydraulic pressure control system for an automatic transmission in accordance with an embodiment of the present invention.

FIG. 1 shows a construction of a main unit of a vehicle equipped with a hydraulic pressure control system of an automatic transmission according to the embodiment of the present invention.

The main unit of the vehicle comprises an internal combustion engine 10, an automatic transmission 20, a torque converter 30, a lockup clutch 40, a control unit 50, a starter motor 13, a 42-volt motor (motor/generator) 60 and the like as shown in FIG. 1.

A fuel supply device 11 is attached to engine 10 so as to supply fuel to engine 10. A chain sprocket 12 is connected to engine 10 and is interconnected with a chain sprocket 62 connected to a motor/generator 60 via a chain 63. Motor/generator 60 functions as a generator of generating electric power according to a condition of starter motor 13, an operating condition of the generator under a vehicle decelerating condition and an electricity charged condition of a battery. Basically starter motor 13 is used as a starter of starting engine 10 when engine 10 is first started, and motor/generator 60 is used as a starter when engine 10 is restarted after an idle stop was executed.

A pump 22 of a mechanical type is provided in automatic transmission 20 and is driven by engine 10 to generate a hydraulic pressure.

A control unit 50 is connected to an idle switch 1, a brake switch 2, a steering angle sensor 3, an oil temperature sensor 4 and a vehicle speed sensor 5 to receive signals thereof. Control unit 50 controls starter motor 13, motor/generator 60 and fuel supply device 11 according to the signal sent from the sensors 1, 2, 3, 4 and 5.

Figure 2:
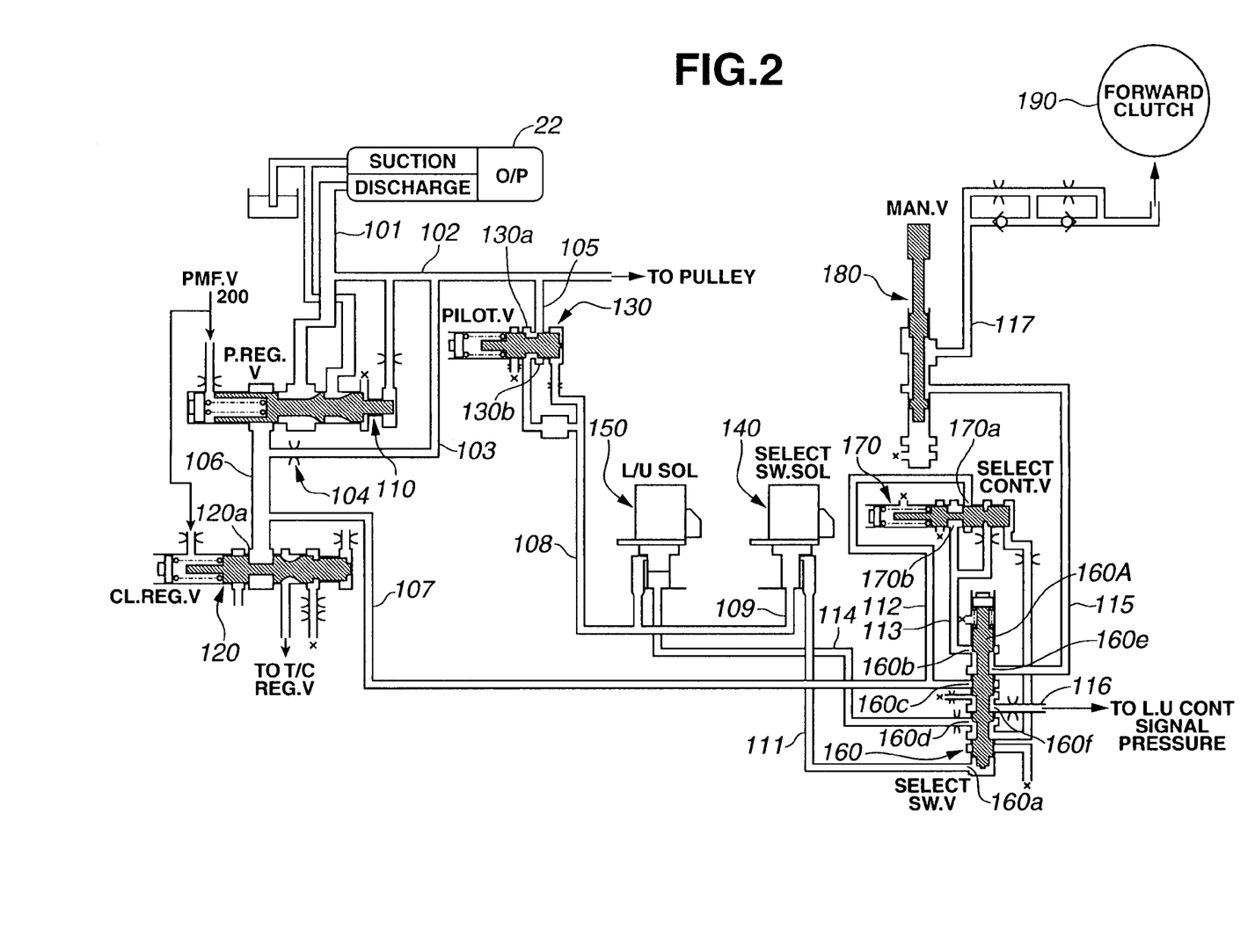
FIG. 2 is a hydraulic circuit diagram showing a hydraulic pressure supply to a forward clutch of the automatic transmission of the embodiment according to the present invention.

FIG. 2 shows a hydraulic circuit diagram which represents a hydraulic supply to a forward clutch 190 of automatic transmission 20 of the embodiment according to the present invention. This hydraulic circuit comprises a pressure regulator valve 110, a clutch regulator valve 120, a pilot valve 130, a select switching solenoid 140 corresponding to a second engagement control actuator, a lockup solenoid valve 150 corresponding to a first engagement control actuator, a select switching valve 160, a select control valve 170, a manual valve 180, a forward clutch 190 corresponding to an engagement element, and a pressure modifier valve 200.

When pump 22 is driven according to the driving of engine 10, a discharge pressure of pump 22 is led to pressure regulator valve 110 through an oil passage 101. Pressure regulator valve 110 controls a line pressure.

The line pressure controlled by pressure regulator valve 110 is supplied to an oil passage 103 and an oil passage 105 via an oil passage 101 and an oil passage 102. The line pressure supplied to oil passage 102 is supplied to a shift control valve (not shown) and the like as a source pressure of a pulley hydraulic pressure. The line pressure supplied to oil passage 105 is supplied to a port 130a of pilot valve 130. Pilot valve 130 produces a pilot pressure by decreasing the line pressure to a constant pressure corresponding to a preset load of a spring in pilot valve 130. The line pressure supplied oil passage 103 is supplied to an oil passage 106 through an orifice 104.

Clutch regulator valve 120 is disposed downstream of pressure regulator valve 110. Clutch regulator valve 120 controls the hydraulic pressure drained from pressure regulator valve 110. The hydraulic pressure controlled by clutch regulator valve 120 is used to control an engagement pressure of forward clutch 190.

Pressure regulator valve 110 and clutch regulator valve 120 are controlled in pressure according to a signal pressure which is set according to a throttle opening and the like and which is supplied from pressure modifier valve 200. More specifically, the forward clutch hydraulic pressure set by clutch regulator valve 120 varies in synchronization with a pulley set pressure. For example, when a high pulley pressure is demanded, that is, when an input torque is large, the forward clutch hydraulic pressure is also increased to prevent a belt slippage on the pulley.

Select switching valve 160 is a switching valve for switching a connected oil passage according to a signal pressure of lockup solenoid 150 of a two-way proportion valve. Select switching valve 160 employs the pilot pressure supplied from a port 130b of pilot valve 130 through an oil passage 108 and an oil passage 109 as a source pressure and determines a ON/OFF state of select switching valve 160 according to a command signal sent from control unit 50.

When select switching solenoid 140 is turned ON, a spool valve 160A of select switching valve 160 is pushed up along the upward direction in FIG. 2. In response to this lifting of spool valve 160A (under this ON state), the hydraulic pressure supplied from an oil passage 107 is supplied to forward clutch 190 via an oil passage 112, a port 170a, a port 170b of select control valve 170, a port 160b and a port 160a of select switching valve 160, an oil passage 115, a manual valve 180 and an oil passage 117 in the order of mention.

When select switching solenoid 140 is turned OFF, spool valve 160A of select switching valve 160 is positioned at a lowermost position due to a biasing force of the spring installed in an upper portion in a cylinder of select switching valve 160. Under this OFF state, the hydraulic pressure supplied from oil passage 107 is supplied to forward clutch 190 via a port 160c of select switching valve 160, a port 160e of select switching valve 160, an oil passage 115, manual valve 180 and oil passage 170b in the order of mention. The signal pressure supplied from lockup solenoid 150 is supplied to lockup clutch (not shown) via an oil passage 114, a port 160d of select switching valve 160, a port 160f of select switching valve 160, and an oil passage 116 in the order of mention to control an engagement pressure of the lockup clutch.

Figure 3:
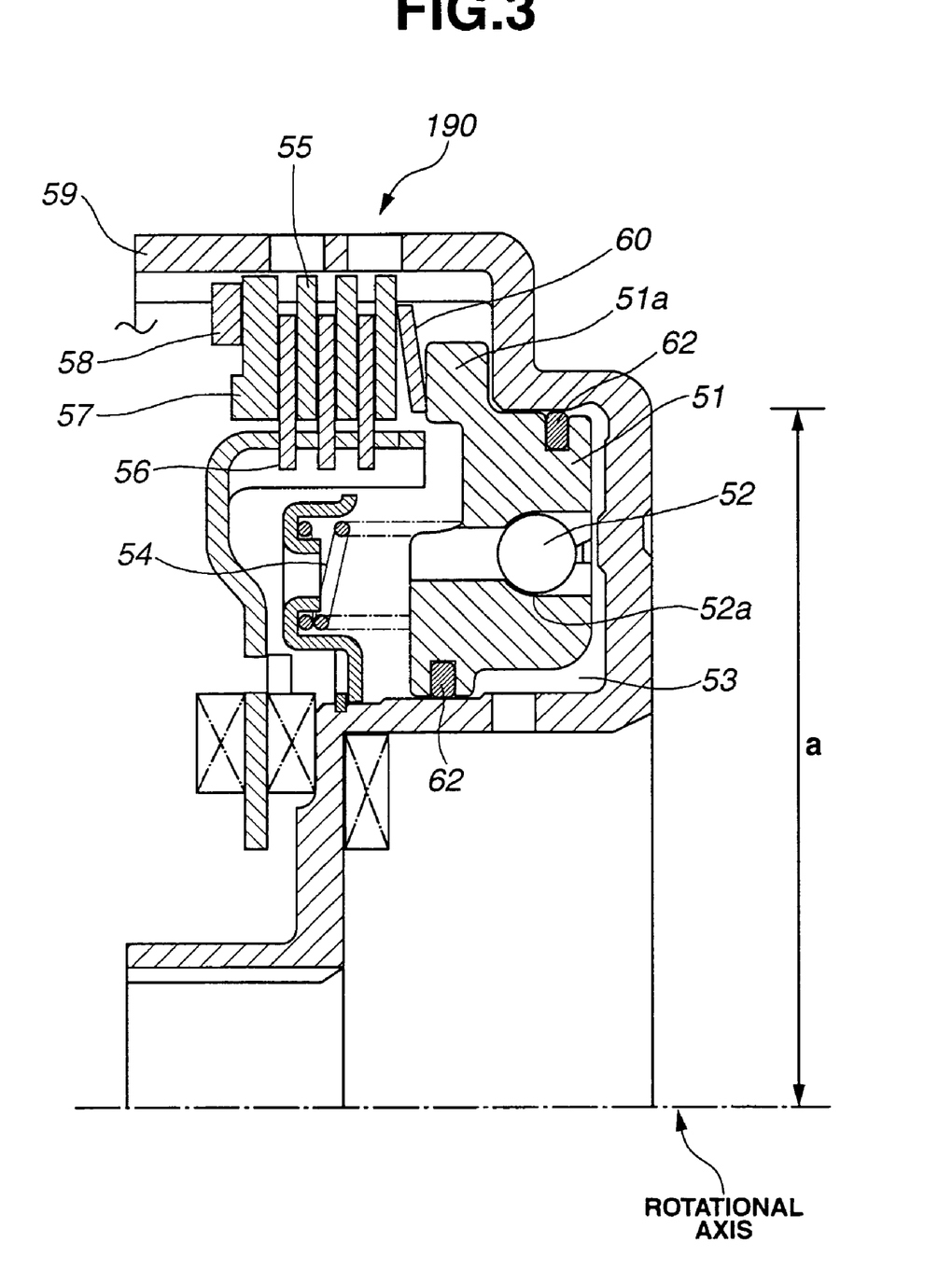
FIG. 3 is a cross sectional view showing the forward clutch of the embodiment according to the present invention.

Herein, there is discussed the construction of forward clutch 190. FIG. 3 shows a cross sectional view of forward clutch 190. Forward clutch 190 is of a wet type multi-plate clutch and comprises a hydraulic piston 51, a drift-on ball 52 corresponding to an oil discharging valve, a piston chamber 53, springs 54, driven plates 55, drive plates 56, a retaining plate 57, a stopper ring 58, an input drum 59 and a dish plate 60.

Figure 4:
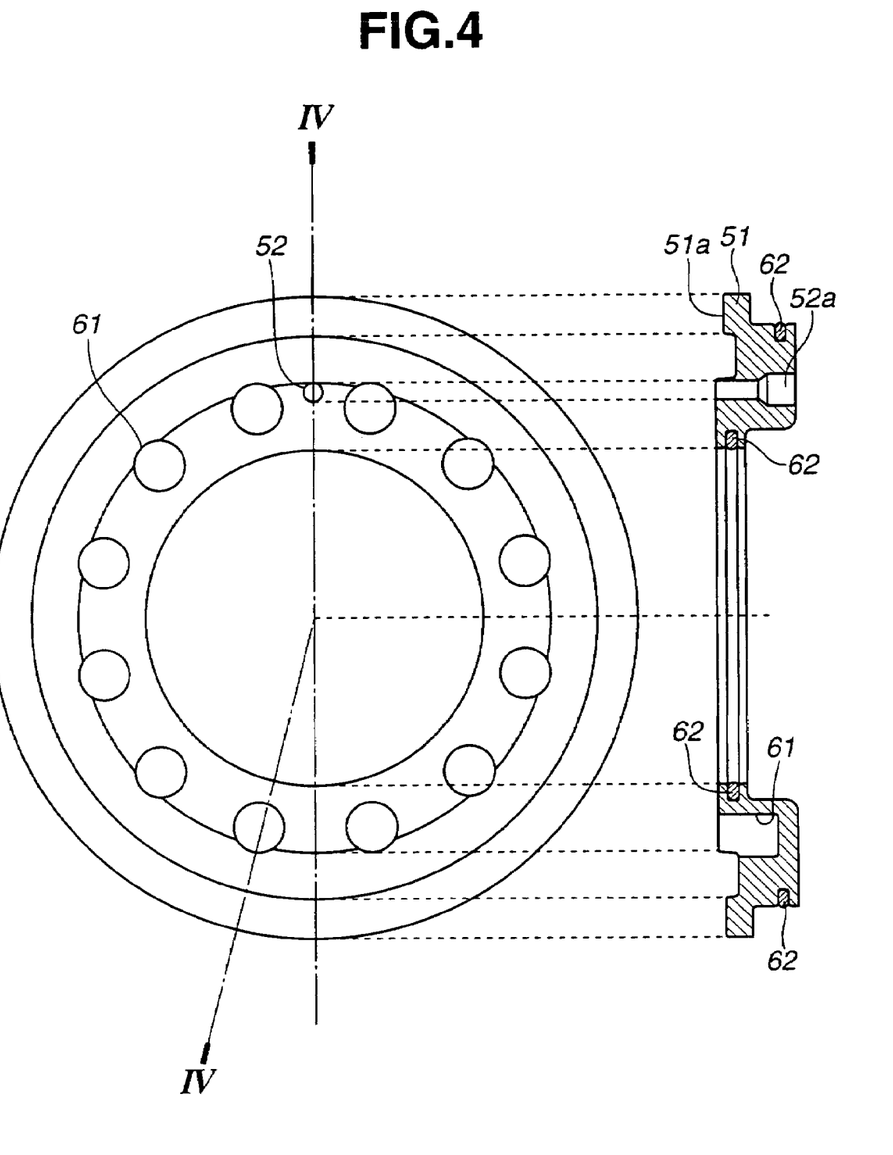
FIG. 4 is a detailed view showing a hydraulic piston of the forward clutch in FIG. 3.

FIG. 4 shows a hydraulic piston 51 of forward clutch 190. A drawing located at the left hand side on FIG. 4 is a plan view of hydraulic piston 51 as viewed from an axial end of forward clutch 190. A drawing located at the right hand side on FIG. 4 is a cross sectional view of forward clutch 190.

A plurality of springs 54 are disposed on hydraulic piston 51 at equal intervals. Therefore, a plurality of spring holes 61 are formed on hydraulic piston 51 at equal intervals so as to correspond with springs in position. A position of a ball receiving hole 51a of drift-on hole 52 is almost the same as the position of spring holes 61 in the diametrical direction, and is located between the adjacent two spring holes 61 in the circumferential direction. This arrangement enables hydraulic piston 51 to be formed small in diameter.

Generally, it is necessary to locate both of drift-on ball 52 and springs at positions where a thickness of the piston is thick. Therefore, a drift-on ball has been formed at a position where the piston is thick and is different from the positions of the spring in the diametrical direction. In contrast to the conventional arrangement of the drift-on ball and the spring, the embodiment according to the present invention is arranged such that drift-on ball 52 and springs 54 are positioned at thick portions on the same circle. This arrangement decreases the area of thick portions of hydraulic piston 51 and suppresses the diameter of hydraulic piston 51.

Since ball receiving hole 52a and spring holes 61 are located so as to be overlapped with each other in the diametrical direction, it is not necessary to increase a thickness of hydraulic piston 50 in the axial direction. Further, a piston end surface 51a of pushing dish plate 60 projects outwardly so as to form an overhang portion. This arrangement of piston end surface 51a of hydraulic piston 50 suppresses an axial dimension of hydraulic piston 51 and decreases the cross sectional area of hydraulic piston 51.

The hydraulic pressure supplied to forward clutch 190 is led to piston chamber 53. An outer circumferential surface of hydraulic piston 51 slides on an outer cylindrical surface of input drum 59 through sealing member 62 along the axial direction, and an inner circumferential surface of hydraulic piston 51 slides on an inner cylindrical surface of input drum 59 through a sealing member 62. In forward clutch 190, dish plate 60 is disposed between an end portion of the plurality of clutch plates 55 and an end surface of hydraulic piston 51. When hydraulic piston 51 slides in the left hand direction on FIG. 3 by receiving the engagement pressure into piston chamber 53, drift-on ball 52 is pushed in the left hand side and closes ball receiving hole 52a. Further, hydraulic piston 51 pushes and flattens dish plate 60 against the biasing force of springs 54 and completes the movement itself. After this movement, forward clutch 190 generates an engagement force according to the received hydraulic pressure.

When hydraulic piston 52 (forward clutch 190) is released, hydraulic piston 51 slides in the right hand side in FIG. 3, and drift-on ball 52 moves toward piston chamber 53. By this movement, ball receiving hole 52a is opened and establishes a fluid communication between piston chamber 53 and a side of providing springs 54. Accordingly, the hydraulic fluid in piston chamber 53 is discharged through ball receiving hole 52a.

Hereinafter, there is discussed an optimization theory of the hydraulic circuit. In case that torque converter 30 connected to automatic transmission 20 is employed as a starting element, it is necessary that an engagement capacity of forward clutch 190 is set to be greater than a product of a maximum torque of engine 10 and a stall torque ratio of torque converter 30. That is, forward clutch 190 is requested to have a higher engagement force as compared with that of lockup clutch 40. When the engagement capacity of forward clutch 190 is controlled by an actuator of controlling the hydraulic pressure of lockup clutch 40, the hydraulic pressure necessary for engaging lockup clutch 40 tends to be small. Accordingly, if an effective cross sectional area of the hydraulic piston chamber of forward clutch 190 is small, the diameter of clutch plate of forward clutch 190 is small and therefore a torque capacity of forward clutch 190 becomes short. In order to complement the shortage of the engagement capacity, it is necessary to increase the number of clutch plates of forward clutch 190, and therefore the axial dimension of automatic transmission becomes long by this increase of the number of the clutch plates. In order to ensure a necessary engagement capacity of forward clutch 190 without elongating the axial dimension, the forward clutch has been arranged to increase the effective cross sectional area of hydraulic piston chamber.

Herein, by increasing the effective cross sectional area of hydraulic piston chamber of forward clutch 190, the quantity of hydraulic fluid to be supplied to the hydraulic piston chamber increases according to the increase of the effective cross sectional area. However, such an increase of the necessary quantity of the hydraulic fluid increases a delay of the hydraulic startup of forward clutch 190. The delay of the hydraulic startup largely affect the vehicle performance in case that the engagement operations of forward clutch 190 are frequently executed and the requested engagement capacity of forward clutch is relative large, such as a case of the engine restart after the idle stop.

Figure 6:
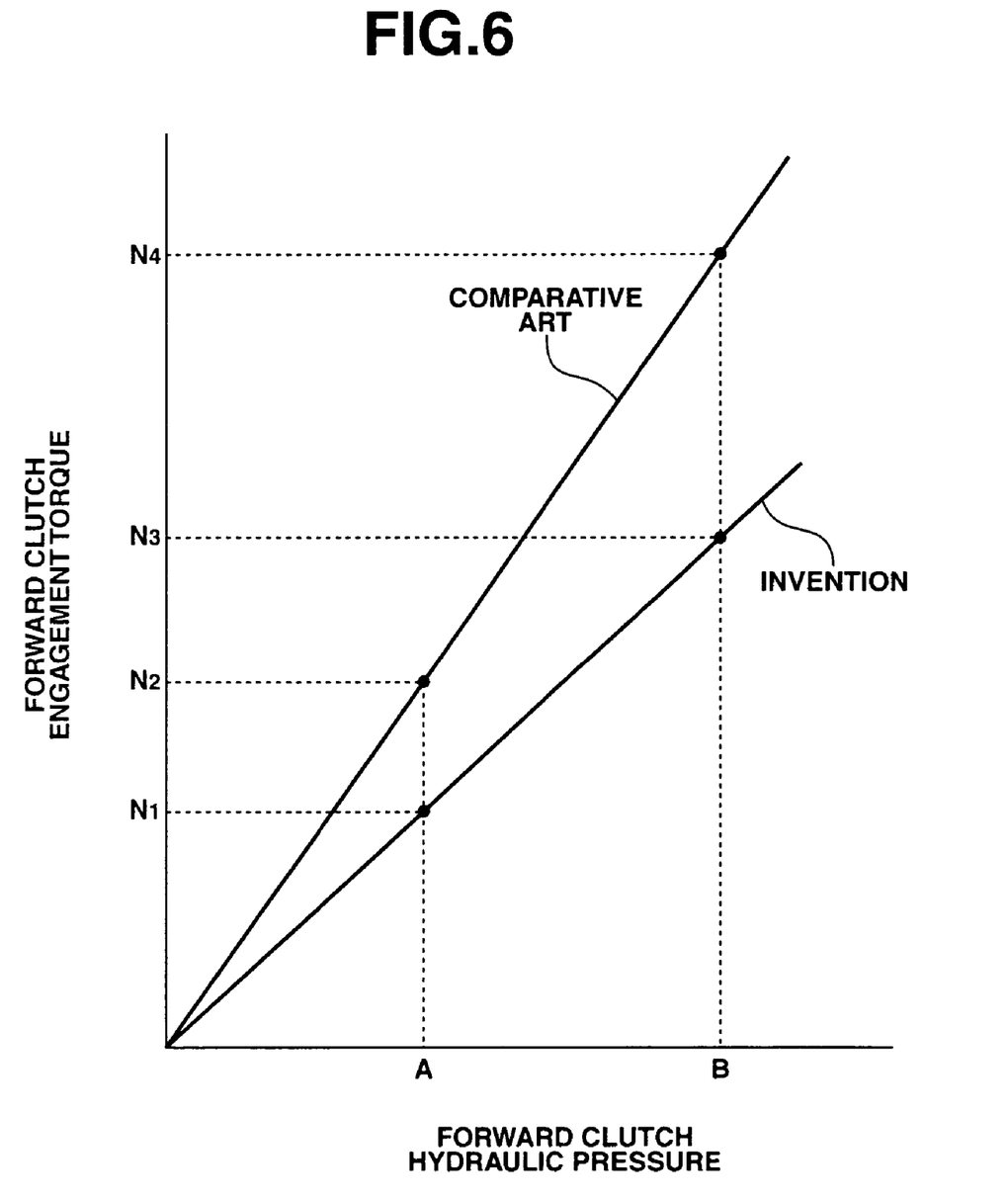
FIG. 6 is a graph showing a relationship between a hydraulic pressure of the forward clutch and an engagement torque of the forward clutch.

FIG. 6 shows a relationship between the hydraulic pressure and the engagement torque of forward clutch 190 of the embodiment according to the present invention. In the graph of FIG. 6, a horizontal axis denotes a hydraulic pressure, a vertical axis denotes an engagement torque. Reference A on the horizontal axis is a hydraulic pressure corresponding to the maximum engagement pressure which is capable of being controlled by lockup solenoid 150, and reference B on the horizontal axis is the hydraulic pressure corresponding to the maximum engagement pressure which is capable of being controlled by clutch regulator valve 120. A conventional forward clutch has ensured a torque $N_2$ as a forward clutch engagement torque by receiving the hydraulic pressure A. This torque $N_2$ is sufficiently larger than a torque derived from the product of the maximum engine torque and the torque converter stall torque ratio. In contrast, the effective cross sectional area of forward clutch 190 of the embodiment according to the present invention is set such that the forward clutch engagement torque obtained by the hydraulic pressure A corresponding to the maximum engagement pressure of lockup solenoid 150 becomes equal to the product $N_1$ of the maximum engine torque and the torque converter stall torque ratio.

Therefore, when the hydraulic circuit of the embodiment according to the present invention is employed, the effective cross sectional area of hydraulic piston chamber 53 is set at a necessary minimum cross sectional area which generates the engagement capacity capable of transmitting the torque corresponding to the product of the engine maximum torque and the torque converter stall torque ratio. This arrangement enables forward clutch 190 to be formed at a necessary minimum size.

There is discussed the advantages of the present invention by comparing the structure of forward clutch according to the present invention with a structure of a known forward clutch.

Figure 7:
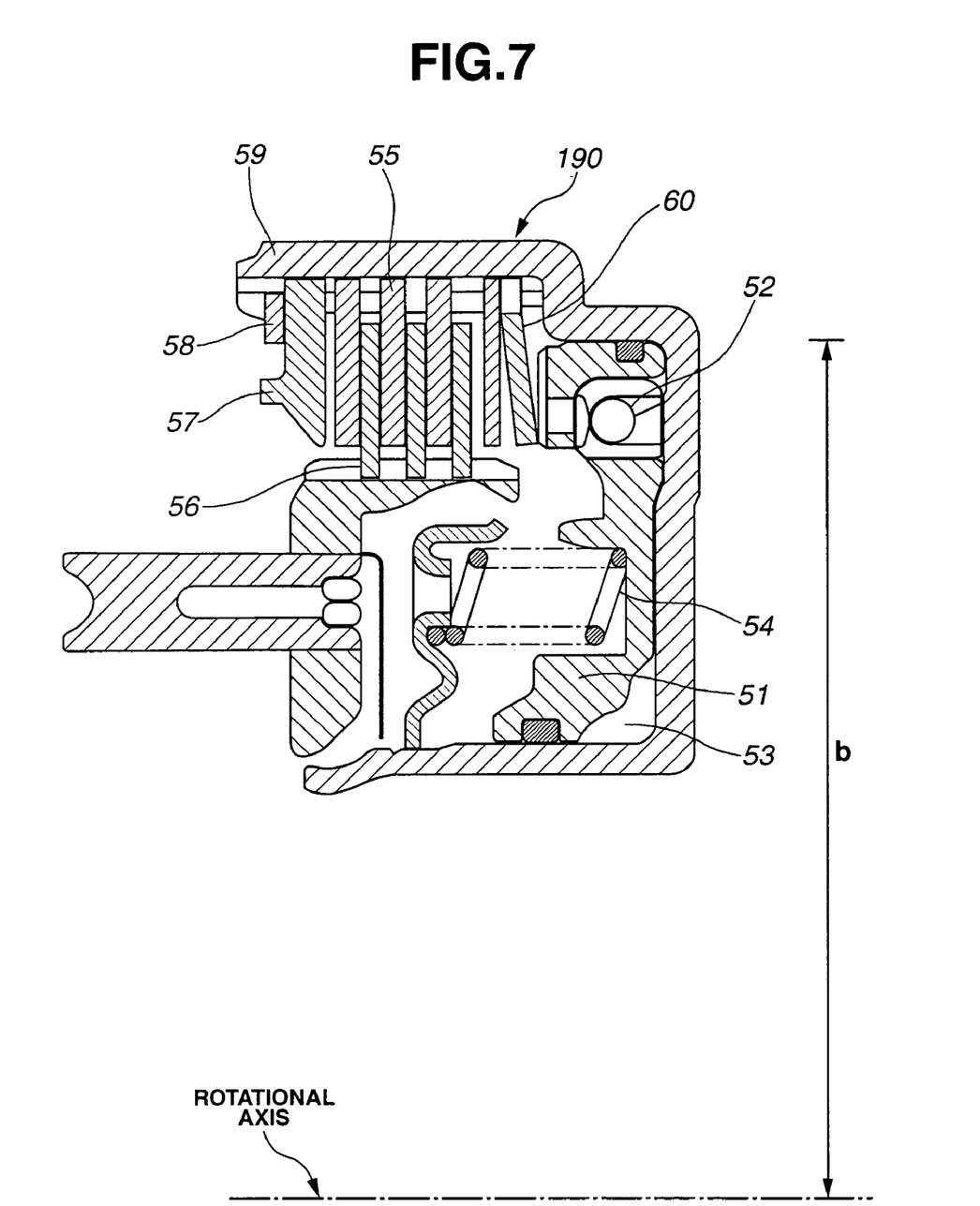
FIG. 7 is a cross sectional view showing a forward clutch compared with the forward clutch according to the present invention.

A hydraulic piston radius of forward clutch 190 of the embodiment according to the present invention shown in FIG. 3 is set at a, and a hydraulic piston radius of forward clutch of a related art shown in FIG. 7 is set at b. The conventional forward clutch shown in FIG. 7 is arranged such that the diametrical position of drift-on ball 52 is located outside of the diametrical position of springs 54 relative to a rotational axis. This arrangement possibly decreases a centrifugal hydraulic pressure caused by the residual hydraulic pressure after discharging the hydraulic pressure, at a small value. However, the conventional arrangement increases the hydraulic quantity to be supplied at a pre-charging phase of the engine restart period after the idle stop operation.

In contrast to this, forward clutch 190 of the embodiment according to the present invention is arranged such that the diametrical position of drift-on ball 52 generally corresponds to the diametrical positions of springs 54 so as to decrease the hydraulic piston radius a. Accordingly, it becomes possible to decrease the hydraulic supply quantity at the engine restarting period after the idle stop operation.

Figure 5A:
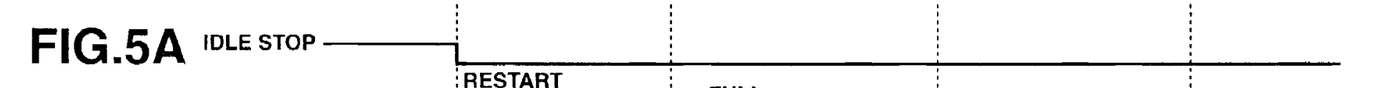
FIGS. 5A, 5B and 5C are time charts showing the control procedure at an engine restart period after an idle stop.
Figure 5B:
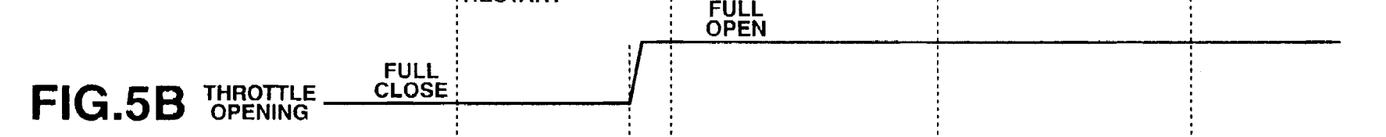
Figure 5C:
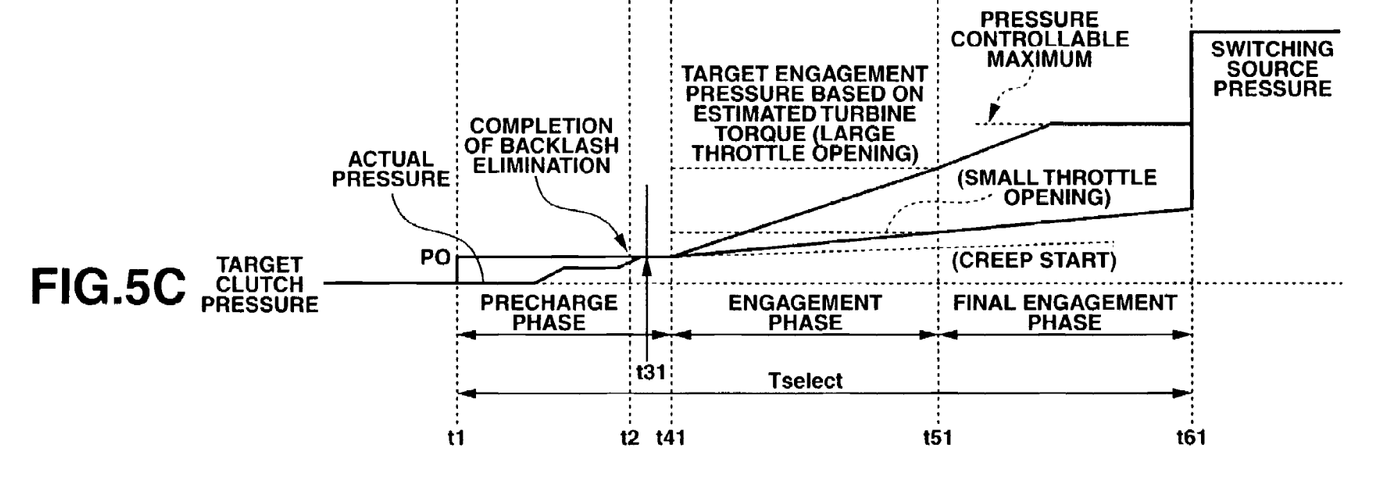

FIGS. 5A through 5C are time charts showing the engine restart control executed in the embodiment according to the present invention. In these time charts, command pressures are outputted at a pre-charge phase, an engagement phase and a final engagement phase, respectively.

At moment t1, an engine restart command pressure is outputted, and therefore the operation phase proceeds to the pre-charge phase. An engagement-pressure command pressure is set at a command pressure P0 which enables only the creep torque to be transmitted so as to output a constant command pressure without being affected by the throttle opening. When the engagement command pressure is a relatively small value corresponding to a creeping torque, the control of the engagement element is executed using the lockup solenoid 150 of controlling lockup clutch 40.

At moment t2, the throttle opening is increased from a full close state toward a full open state.

At moment t31, the engagement pressure corresponding to the creep torque is supplied, and therefore dish plate 60 is flattened by the pushing force. By this supply of the engagement, plays among clutch plates (drive plates and driven plates) are removed. When the actual pressure reaches the target pressure, it is determined that the removal of plays among the clutch plates was completed.

At moment t41, the engagement phase starts, and the command pressure is set at the target engagement pressure determined according to throttle opening TVO and engine speed and is outputted.

At moment t51, the actual engagement reaches the target engagement pressure, and the final engagement phase starts.

At moment t61, engagement timer value T0 becomes greater than or equal to a pre-set pressure control time, and select switching solenoid 140 is turned OFF. Accordingly, a not-controlled source pressure, that is, a controlled pressure controlled by clutch regulator valve 120 is directly supplied to forward clutch 190. At this moment, forward clutch 190 is put in the complete engagement state. Therefore, even if a high pressure is supplied to forward clutch 190, no engagement shock is caused thereby.

More specifically, when the demanded clutch engagement capacity is relatively small as is under a creep running condition, the control is executed by controlling lockup solenoid 150. After the engagement is completed, the supply of the clutch pressure is executed by controlling select switching solenoid 140. When the demanded clutch engagement capacity is relatively small, such as at the engine restart after the idle stop, the torque capacity of forward clutch 190 is controlled. Until forward clutch 190 is put in the lockup state, it is possible to execute the control using lockup solenoid 150. Therefore, it becomes possible to set the volume of piston chamber 53 of forward clutch 190 at a necessary minimum. This arrangement decreases the hydraulic fluid supply quantity, and enables the vehicle to quickly start running at the engine restart after the idle stop.

Hereinafter, there is discussed the advantages of the embodiment according to the present invention.

By using the hydraulic circuit of the embodiment according to the present invention, it becomes possible to set the effective cross sectional area of hydraulic piston 51 of forward clutch 190, which is an engagement element engaged during the vehicle running, at the minimum area which has an engagement capacity of transmitting the product of the maximum torque of engine 10 and the stall torque ratio of torque converter 30. This arrangement according to the present invention enables the effective cross sectional area of hydraulic piston chamber 53 to be decreased at a necessary minimum size, and therefore it becomes possible to decrease the hydraulic fluid quantity to be supplied to hydraulic piston chamber 53 of forward clutch 190. Accordingly, it becomes possible to prevent the hydraulic startup delay of forward clutch at the engine restart executed after the idle stop and to smoothly start running of the vehicle. Further, by decreasing the outer diameter 2a of hydraulic piston 51, it becomes possible to lower the centrifugal hydraulic pressure caused by the residual hydraulic remained after the hydraulic discharging.

When the requested engagement capacity of forward clutch 190 is relatively small such as during a creep running, the control using lockup solenoid 150 is employed. After the engagement of forward clutch 190 is completed, the clutch engagement pressure is controlled by clutch regulator valve 120 through the control of select switching solenoid 140 and is supplied to forward clutch 190. Since it is not necessary to finely control the engagement force when forward clutch 190 is requested to be completely engaged, clutch regulator valve 120 is set by a pressure modifier pressure based on the line pressure solenoid. This arrangement according to the present invention requires no special solenoid for the clutch regulator valve and decreases the number of parts.

The diametrical position of drift-on ball 52 is generally corresponded to the diametrical positions of springs 54. This arrangement according to the present invention enables hydraulic piston 51 to be formed small in diameter. Further, this arrangement does not require a special thick portion for drift-on ball 22, and decreases the axial dimension of forward clutch 190.

The plural number of springs 54 are circumferentially provided at equal intervals, and a diametrical position of ball receiving hole 52a of drift-on ball 52 is generally equal to the diametrical position of spring holes 61. Further, the circumferential position of ball receiving hole 52a is disposed between two adjacent spring holes 51. By this arrangement, it becomes possible to decrease the diameter of the outer peripheral surface of hydraulic piston 51. Further, it becomes possible to dispose ball receiving hole 52a and spring holes 61 in hydraulic piston 51 overlappedly in the diametrical direction. Further, since it is not necessary to increase the thickness in the axial direction of hydraulic piston 51 for the prevision of ball receiving hole 52a, it becomes possible to decrease the size of hydraulic piston 51.

This application is based on a prior Japanese Patent Application No. 2004-45610. The entire contents of the Japanese Patent Application No. 2004-45610 with a filing date of Feb. 23, 2004 are hereby incorporated by reference. The scope of the invention is defined with reference to the following claims.

What is claimed is:

1. A hydraulic pressure control system for an automatic transmission of a vehicle, comprising:
   a hydraulic pressure source driven by an internal combustion engine of the vehicle to generate a hydraulic pressure;
   an engagement element engaged when the vehicle runs, the engagement element having an effective cross sectional area which receives a controlled hydraulic pressure generated from the hydraulic pressure; and
   a first engagement control actuator controlling a lockup clutch of a torque converter, the first engagement control actuator controlling the engagement element by supplying the controlled hydraulic pressure to the engagement element when the vehicle starts running;
   wherein the effective cross sectional area is set at a minimum area which has an engagement capacity capable of transmitting a maximum torque inputted from the engine when the engagement element receives a maximum pressure controlled by the first engagement control actuator.

2. The hydraulic pressure control system as claimed in claim 1, further comprising a second engagement control actuator for controlling the engagement element and an actuator switching means for switching the control of the engagement element from a control using the first engagement control actuator to a control using the second engagement control actuator when the engagement of the engagement element is completed.

3. The hydraulic pressure control system as claimed in claim 1, wherein the engagement element is a wet-type multi-plate clutch which comprises a return spring of generating a biasing force of releasing the engagement element and a drain valve of discharging oil in a piston chamber when the engagement element is released, and wherein a diametrical position of the drain valve is substantially equal to a diametrical position of the return spring.

4. The hydraulic pressure control system as claimed in claim 3, wherein a plurality of the return springs are circumferentially disposed in the engagement element at equal intervals, and the discharge valve is disposed between the return springs.

5. The hydraulic pressure control system as claimed in claim 2, wherein the second engagement control actuator is capable of generating the controlled hydraulic pressure which is higher than the controlled hydraulic pressure generated by the first engagement control actuator.

6. The hydraulic pressure control system as claimed in claim 1, wherein the first control actuator controls the engagement element when the engine is restarted after an idle stop is executed.

7. A hydraulic pressure control system for an automatic transmission with a torque converter, comprising:
    an engagement element put in an engagement state when a vehicle runs, the engagement element including a piston of receiving a controlled hydraulic pressure; and
    a first actuator controlling a lockup clutch of the torque converter, the first actuator controlling the engagement state of the engagement element when the vehicle starts running;
    wherein an effective cross sectional area of the piston is set at a smallest area of areas which have an engagement capacity capable of transmitting a maximum torque inputted from the engine when the engagement element receives a maximum pressure controlled by the first actuator.

8. The hydraulic control system as claimed in claim 7, further comprising a second actuator for controlling the engagement state of the engagement element after the engagement element is engaged by the control of the first actuator.

9. A method of controlling an engagement element of an automatic transmission installed in a vehicle, the method comprising the steps of:
    controlling the engagement element using a first actuator for controlling a lockup clutch of the torque converter when the vehicle starts running; and
    controlling the engagement element using a second actuator which is capable of outputting a hydraulic pressure higher than a hydraulic pressure of the first actuator after the engagement element is engaged by the control of the first actuator.

* * * * *